(12) United States Patent
LeBlanc et al.

(10) Patent No.: US 7,402,074 B2
(45) Date of Patent: Jul. 22, 2008

(54) FLOODLIGHT FEATURING DUAL BRACKET WITH INTEGRAL STRAP TENSIONING AND WIRE SPLICING

(75) Inventors: Kenneth J. LeBlanc, Gloucester, MA (US); Gregory S. Cook, Hollison, MA (US); Oliver C. Frost, Gloucester, MA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 322 days.

(21) Appl. No.: 11/256,210

(22) Filed: Oct. 21, 2005

(65) Prior Publication Data
US 2006/0158875 A1 Jul. 20, 2006

Related U.S. Application Data

(60) Provisional application No. 60/621,138, filed on Oct. 22, 2004.

(51) Int. Cl.
*H01R 4/24* (2006.01)
(52) U.S. Cl. .................. 439/409; 439/534; 439/371; 439/366
(58) Field of Classification Search ........... 439/534, 439/409, 366, 371
See application file for complete search history.

(56) References Cited

U.S. PATENT DOCUMENTS

| | | | |
|---|---|---|---|
| 1,029,404 A | 6/1912 | Schumacher | |
| 1,348,970 A * | 8/1920 | Thompson | 362/390 |
| 2,297,916 A | 10/1942 | Sauer | |
| 2,977,566 A | 3/1961 | Neumann et al. | |
| 3,075,073 A | 1/1963 | Hilbrecht | |
| 3,892,457 A * | 7/1975 | Detch et al. | 439/233 |
| 4,477,864 A | 10/1984 | Van Duyn et al. | |
| 5,584,560 A | 12/1996 | Gosswiller et al. | |
| 5,766,032 A * | 6/1998 | LaPointe et al. | 439/371 |
| 5,954,534 A * | 9/1999 | Hale et al. | 439/409 |
| 6,808,292 B2 * | 10/2004 | Wong | 362/656 |

* cited by examiner

*Primary Examiner*—Tho D. Ta (57) ABSTRACT

A bracket mounted product, such as a floodlight, is provided having a dual latch bracket with integral strap tensioning and wire splicing for mounting on tubing or another suitable mounting structure, featuring a mounting arrangement and a splicing latch arrangement. The mounting arrangement has a mounting base for supporting the light or other suitable product or device on the tubing or another suitable mounting structure, and has a mounting strap for wrapping around the tubing or other suitable mounting structure. The splicing latch arrangement has a swing arm or splicer pivotally arranged on the mounting base for receiving the one or more wires when in an open latch position and for splicing the one or more wires to the internal leads in the mounting base when pivotally rotated to a closed latch position, and also has a mounting lock lever pivotally arranged on the mounting base for receiving the mounting strap when in an open lever position and for frictionally engaging and holding the same when pivotally rotated into a closed latch position for coupling the light to the tubing or another suitable mounting structure.

7 Claims, 10 Drawing Sheets

FIG.7

FLOODLIGHT FEATURING DUAL BRACKET WITH INTEGRAL STRAP TENSIONING AND WIRE SPLICING

CROSS-REFERENCE TO RELATED APPLICATION

This application is related to and claims benefit to provisional application Ser. No. 60/621,138, filed Oct. 22, 2004, which is hereby incorporated by reference in its entirety.

BACKGROUND OF THE INVENTION

1. Technical Field

The present invention relates to a bracket mounted product, including a floodlight; and more particularly, to a bracket mounted product, including a searchlight for a marine vessel or other suitable non-marine vessel.

2. Description of Related Art

Figure 7:
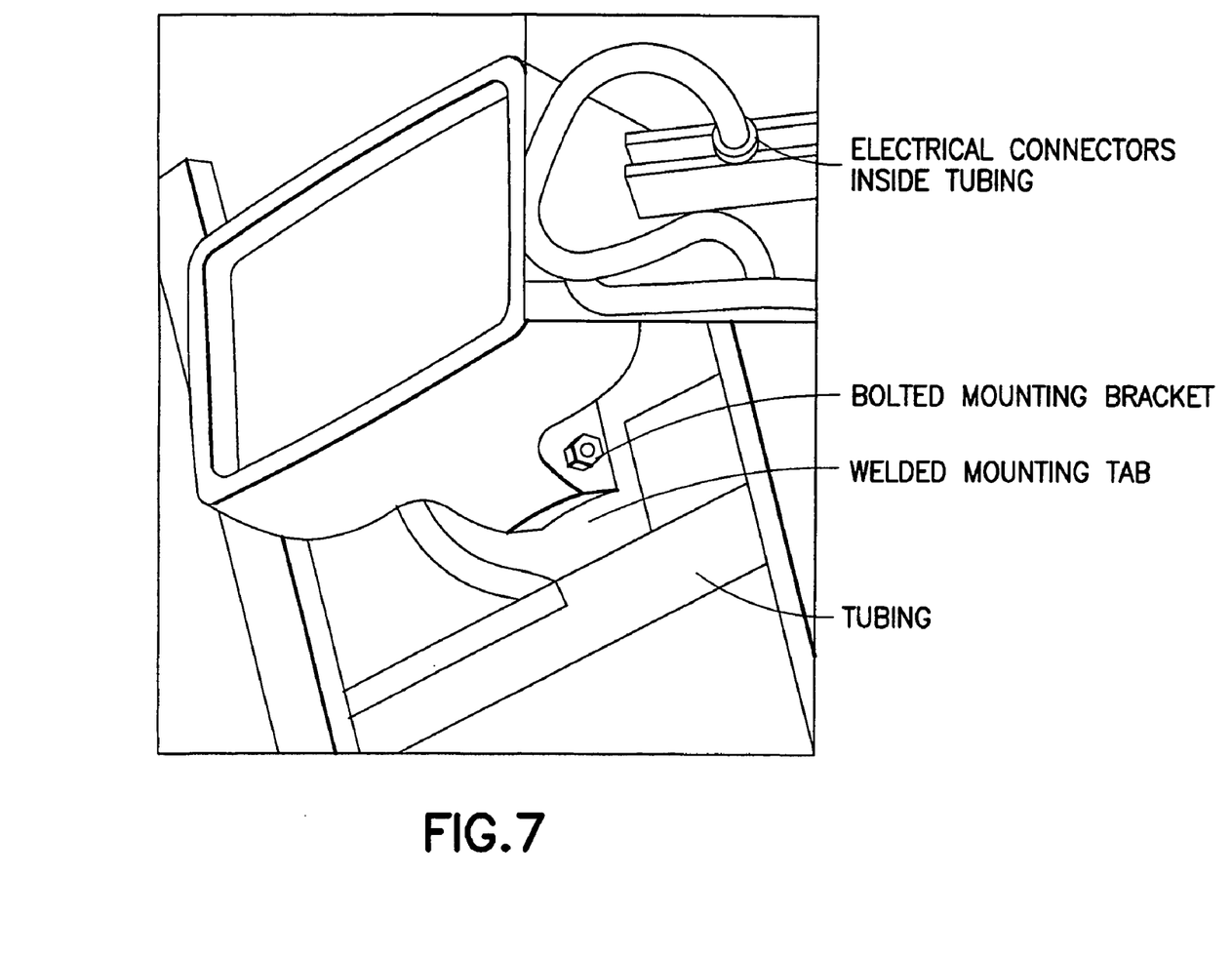
FIG. 7 is a diagram of a known prior art floodlight design.

Many different bracket mounted products, including floodlights, are known in the art for marine and non-marine vessels; however, no bracket mounted product or floodlight is known having one or more of the unique features shown and described herein. The known bracket mounted products or floodlights suffer from the need to weld a mounting tab to the tubing to which bolted brackets are currently mounted, as well as the need for wire connectors and the labor associated with wire stripping, connector crimping and/or soldering when making electrical connections to the bracket mounted products. For example, current bracket mounted designs require that the current electrical wiring of the product be connected to the battery wiring via wire connectors or soldering operations. Once the connections are made, the connections are "stuffed" into the tubing and access hole sealed with a grommet or sealant. See FIG. 7 for a picture of a known prior art floodlight design.

SUMMARY OF THE INVENTION

The present invention provides a new and unique dual latch bracket with integral strap tensioning and wire splicing for a floodlight or other suitable bracket mounted product for marine, as well as a non-marine vessel such as a car, truck, etc.

Moreover, the present invention also provides a light, such as a floodlight, having such a dual latch bracket with integral strap tensioning and wire splicing for mounting on tubing or another suitable mounting structure, featuring a mounting arrangement and a splicing latch arrangement.

The mounting arrangement has a mounting base for supporting the light or other suitable product or device on the tubing or another suitable mounting structure, and has a mounting strap for wrapping around the tubing or other suitable mounting structure.

The splicing latch arrangement has a swing arm or splicer pivotally arranged on the mounting base for receiving the one or more wires when in an open latch position and for splicing the one or more wires to internal electrical leads in the mounting base when pivotally rotated to a closed latch position, and also has a mounting lock lever pivotally arranged on the mounting base for receiving the mounting strap when in an open lever position and for frictionally engaging and holding the same when pivotally rotated into a closed latch position for coupling the light to the tubing or another suitable mounting structure.

The splicing latch arrangement may include wire splicing blades arranged in the mounting base for splicing the wires in response to the pivotal movement of the swing arm or splicer. The splicing latch arrangement may include wire cut off blades arranged in the mounting base to splice the one or more wires in response to the pivotal movement of the swing arm or splicer. The light may be a floodlight or other suitable light.

The scope of the invention is also intended to include a method for splicing the one or more wires to the internal electrical leads in the mounting base, and/or for receiving the mounting strap and frictionally engaging and holding the same for coupling the light to the tubing or another suitable mounting structure.

One advantage of your floodlight is that it can quickly and easily be connected to electrical wires and mounted on tubing or other mounting structure, for providing such a floodlight on, for example, a vehicle.

Another advantage of the present invention is that the tab welding operation in the prior art is hence eliminated.

The new and unique floodlight also provides for a significant reduction in the labor time associated with the installation of the bracket mounted floodlight on marine vessel and non-marine vessel installations, where a bracket is mounted to round, elliptical or other shaped solid bars or tubing of various diameters and cross-sectional shapes and dimensions. This design eliminates the need to weld a mounting tab to the tubing to which the bolted brackets are currently mounted. The design also eliminates the need for wire connectors and the labor associated with wire stripping, connector crimping and/or soldering when making electrical connections to the bracket mounted products.

BRIEF DESCRIPTION OF THE DRAWING

The drawing includes the following Figures, which are not necessarily drawn to scale.

BEST MODE FOR CARRYING OUT THE INVENTION

Figure 3:
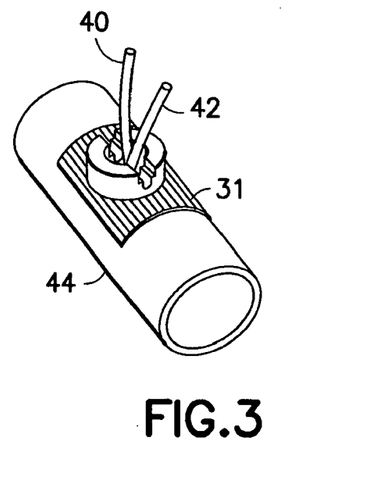
FIG. 3 is a perspective view showing the wires pulled through a tubing hole, then through the sealing grommet according to the present invention.
Figure 4A:
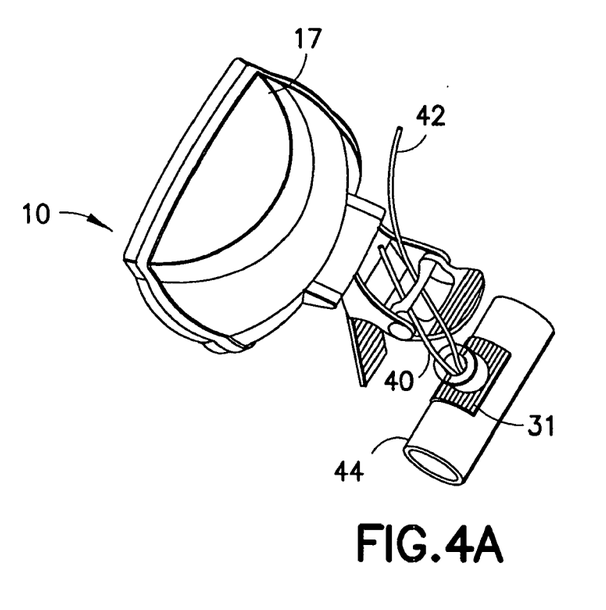
FIGS. 4A and 4B are perspective views of the wires fed through the bracket base and aligned with slots in a splicing latch.
Figure 4B:
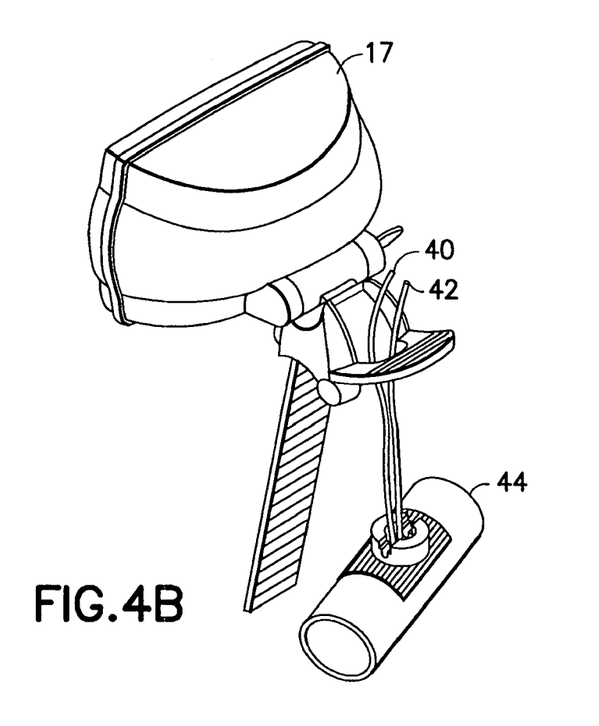
Figure 5A:
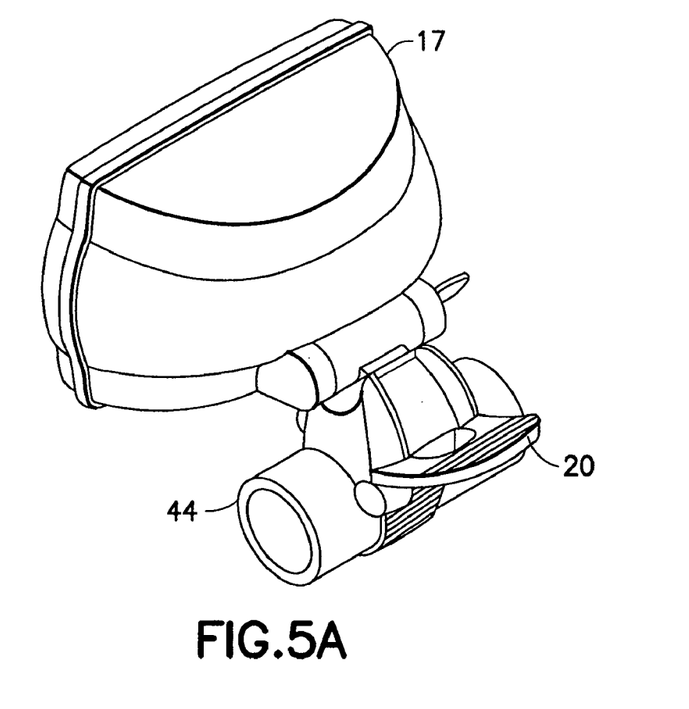
FIGS. 5A and 5B are perspective views of the splicing latch being closed, which splices the wires to the internal electrical leads.
Figure 5B:
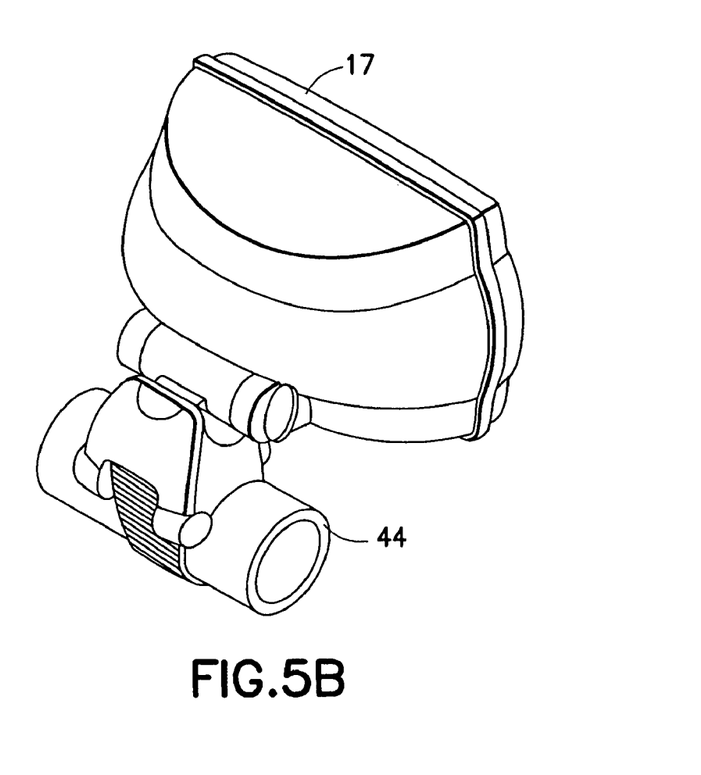
Figure 6A:
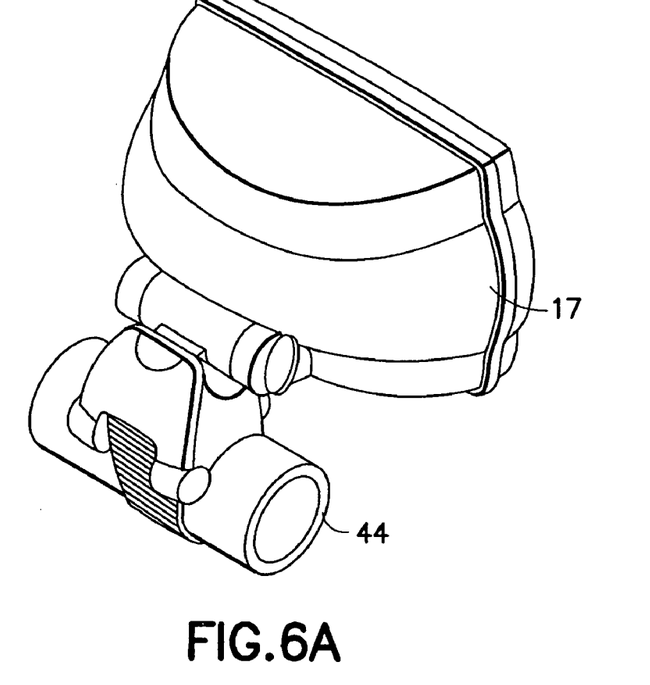
FIG. 6A to 6F include various diagrams of the floodlight according to the present invention, including a back right view, locked; a front view; top views with and without a 23 degrees swivel; a back open view; a back view; and a back left view, locked.
Figure 6B:
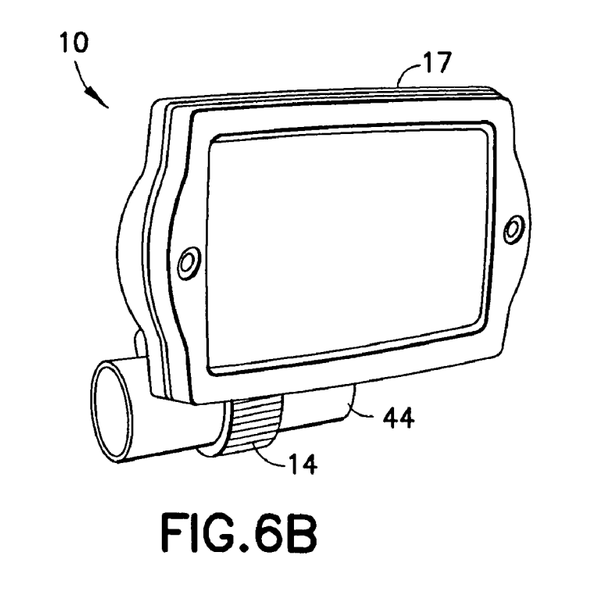
Figure 6C:
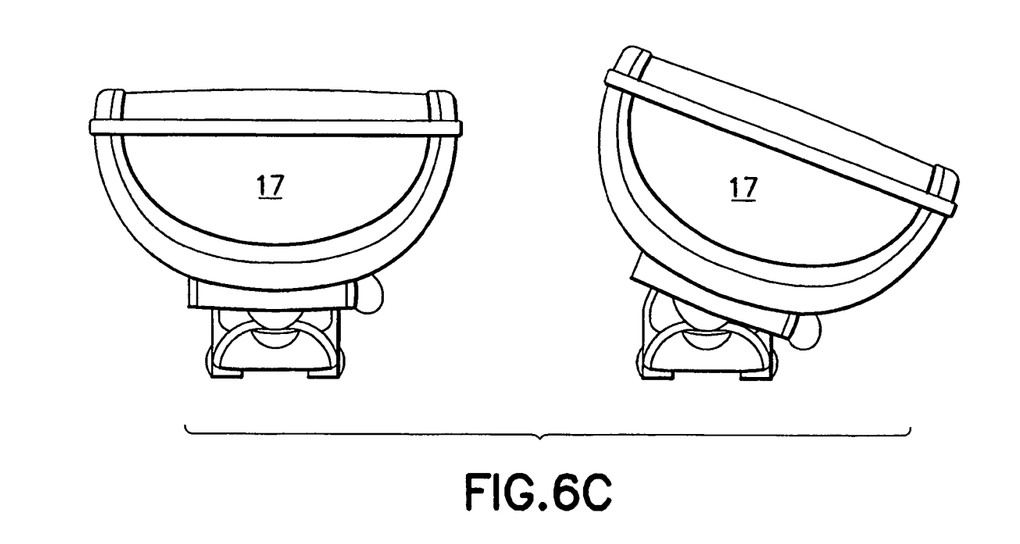
Figure 6D:
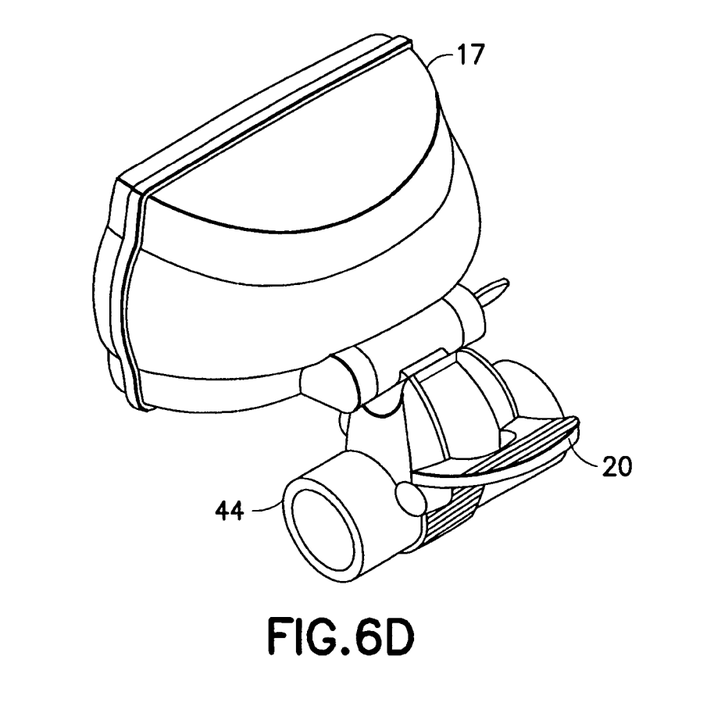
Figure 6E:
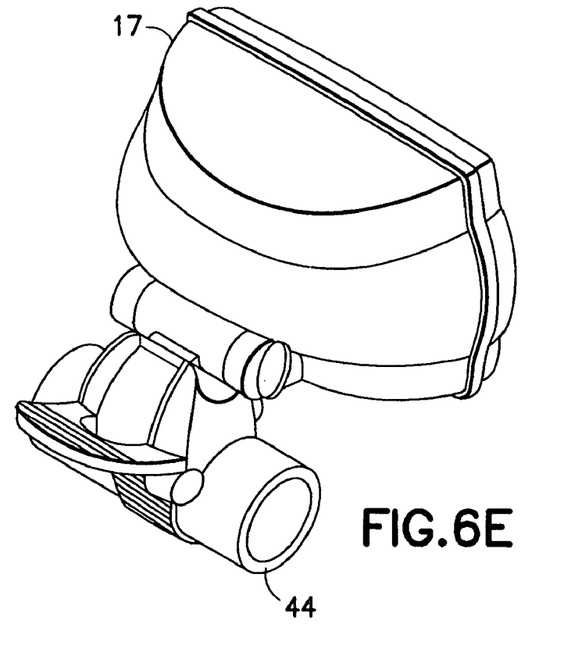
Figure 6F:
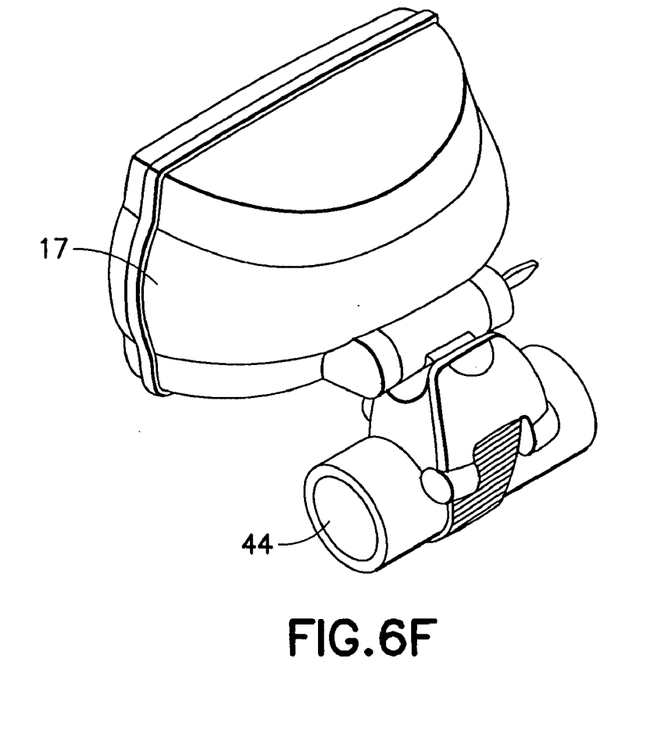

FIGS. 1-6 show a new and unique floodlight generally indicated as 10 for mounting to a tubing 44 (see FIGS. 3-5). The floodlight 10 features a dual latch bracket generally indicated as 12 having an integral strap tensioning and wire splicing technique according to the present invention, for mounting a bulb enclosure assembly 17 of the floodlight 10 to a variety of different tubing shapes and sizes. It is important to note that, although the invention is described in relation to a floodlight having such a dual latch bracket for mounting the same, the scope of the invention is intended to include or other suitable bracket mounted products or devices.

The floodlight 10 includes a dual latch bracket having various parts and elements generally indicated as 12 and a corresponding mounting arrangement having various parts or elements generally indicated as 15.

For example, the mounting arrangement 15 includes a mounting base 16 adapted for supporting the bulb enclosure assembly 17 that is pivotally mounted on a knuckle 19 and held in place by a fastener 21 for coupling into a corresponding knuckle fastening receptor 23. The bulb enclosure assembly may be pivoted upwardly and downwardly on the knuckle 19. The fastener 21 is secured in place by a rubber or other suitable washer 25 to hold the bulb enclosure assembly in place. In operation, the fastener 21 may be loosed so that the bulb enclosure assembly 17 may be adjusted upwardly or downwardly and re-tightened to hold the same in place. The knuckle 19 is rotatable mounted in the mounting base 16 for rotating leftwardly and rightwardly in place, as best shown in relation to FIG. 6C. The mounting arrangement 15 also has a sealing or mounting grommet 31 and a post pivot 33 for coupling the mounting base 16 to the mounting grommet 31. The mounting arrangement 15 also includes a mounting strap 14 for securing the mounting arrangement 15 on the tubing 44, consistent with that described below.

Figure 1:
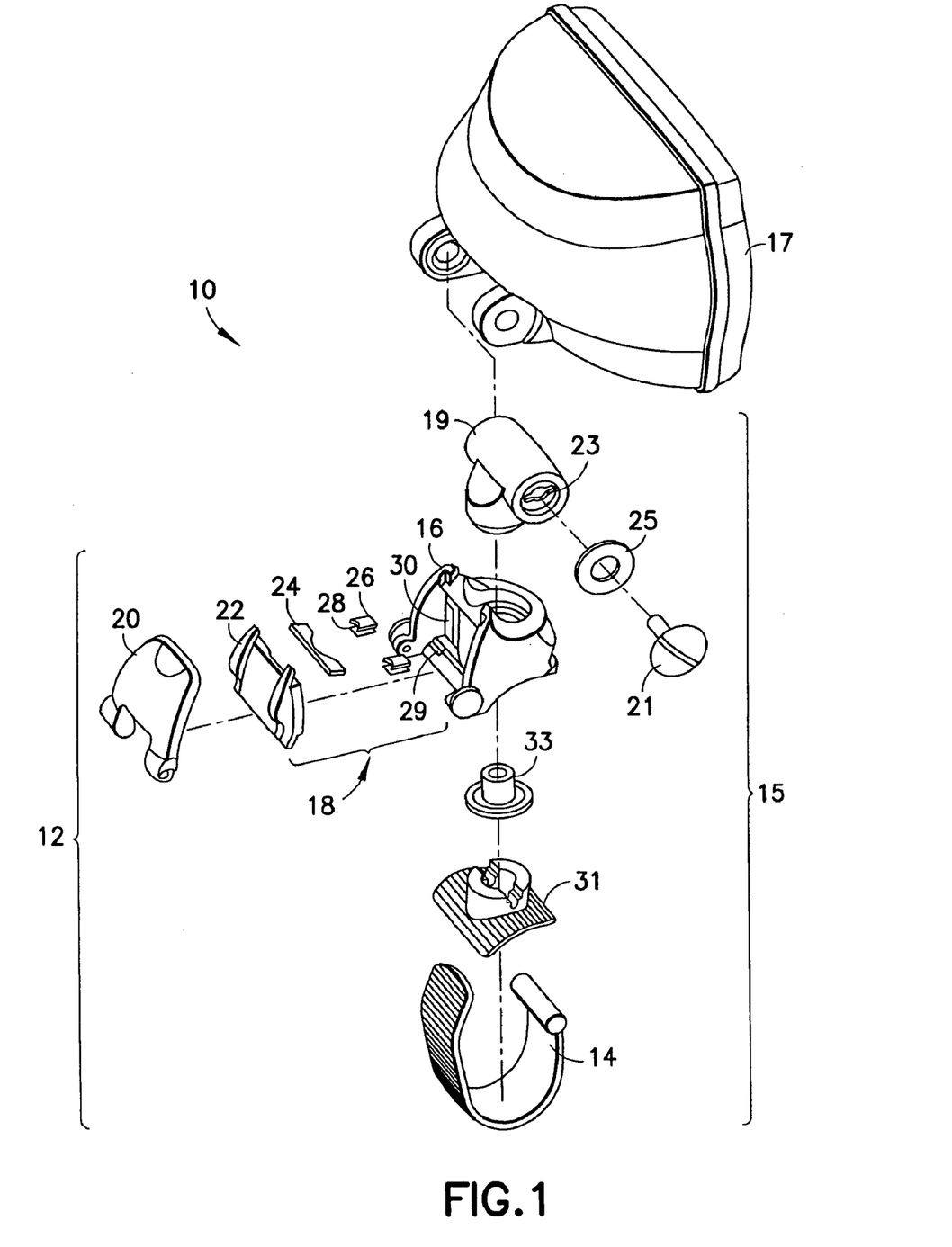
FIG. 1 shows an exploded view of the floodlight according to the present invention.
Figure 2A:
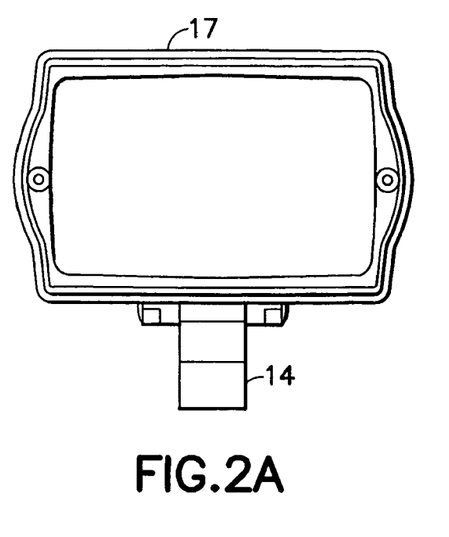
FIGS. 2A to G show various view of the floodlight according to the present invention, including a front view, a side view, a back view, a top view, a perspective view, a sectional view through A-A in FIG. 2D, and a sectional view through B-B in FIG. 2D.
Figure 2B:
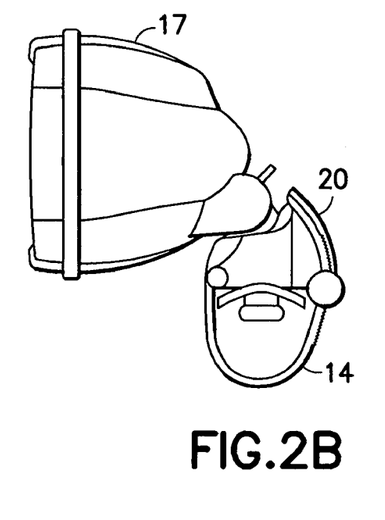
Figure 2C:
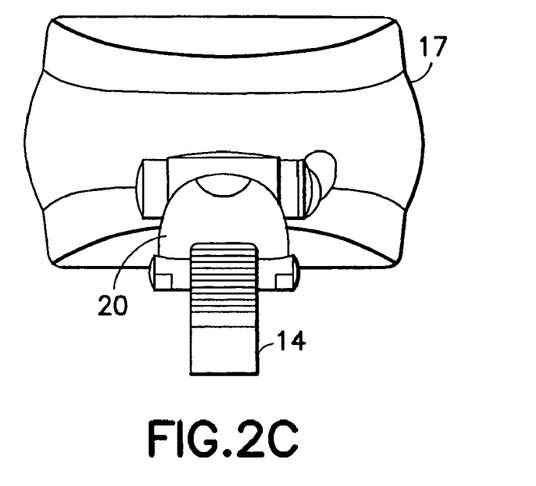
Figure 2D:
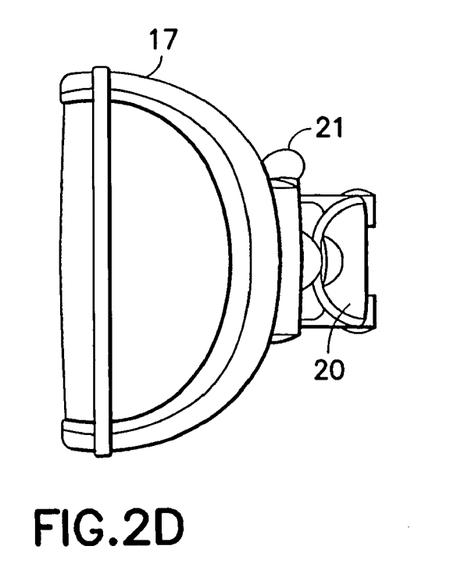
Figure 2E:
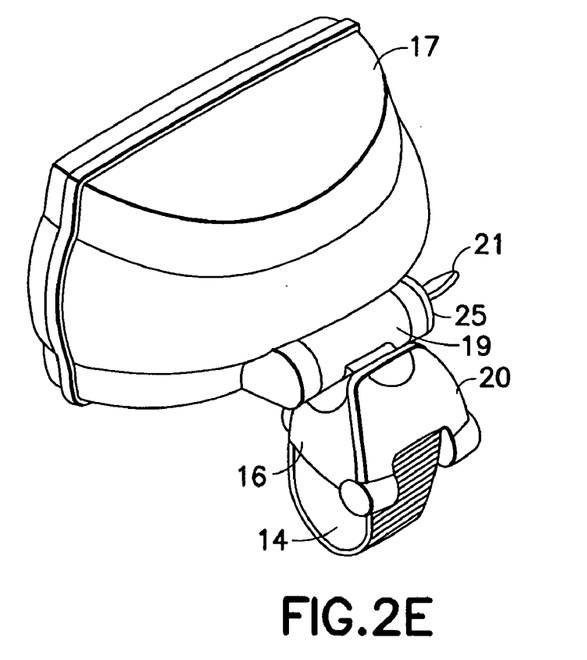
Figure 2F:
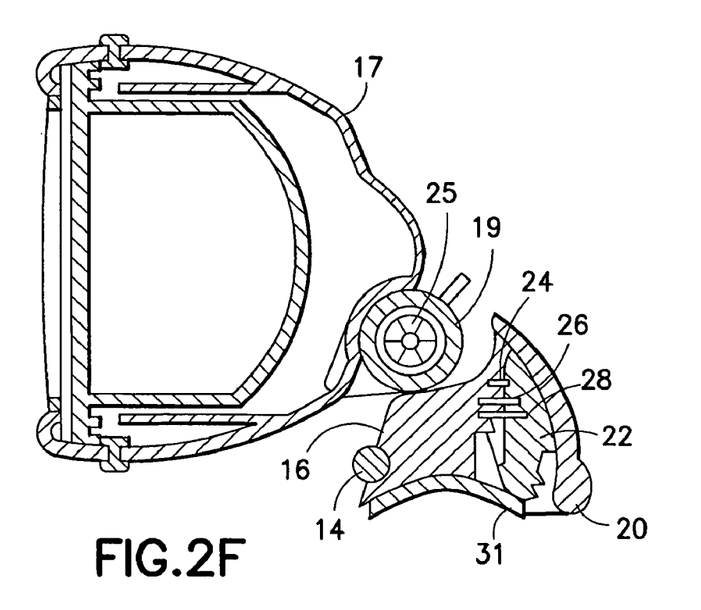
Figure 2G:
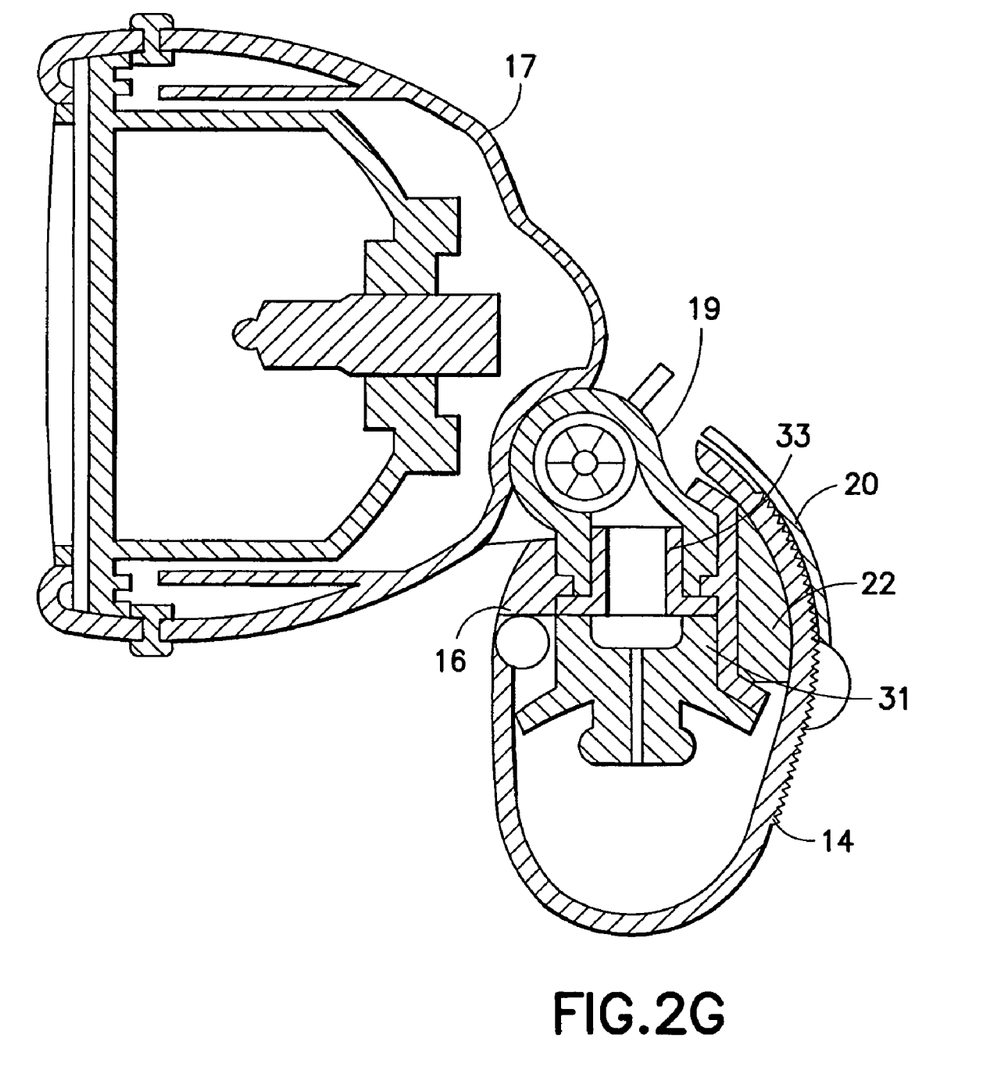

The dual latch bracket 12 includes a splicing latch arrangement generally indicated as 18 that includes a mounting lock lever 20, a swing arm or splicer 22, a splice gasket 24, wire cut off blades 26 and wire splicing blades 28. In operation, as best shown in FIG. 3 wires 40, 42 from a battery or other power source (not shown) are pulled through one or more tubing holes (not shown) in the tube 44, then through the sealing or mounting grommet 31 as shown. The sealing or mounting grommet 31 is then inserted into the tubing hole, thereby effecting a seal. As shown in FIG. 1, the swing arm or splicer 22 is pivotally arranged on the mounting base 16 for receiving the wires 40, 42 when in an open position, as best shown in FIGS. 4A and 4B. The wires 40, 42 are fed through the mounting base 16 and may be aligned with slots 29 that may formed in the mounting base 16. When the swing arm or splicer 22 is pivotally rotated to a closed position, the wire cut off blades 26 and wire splicing blades 28 splices the one or more wires 40, 42 to respective internal electrical leads 30 in the mounting base 16. By way of example, the wire cut off blades 26 and wire splicing blades 28 are shown herein as separate components from the swing arm or splicer 22; however, embodiments are envisioned in which some combination of the wire cut off blades 26, the wire splicing blades 28, and/or the swing arm or splicer 22 are formed as one or more integral units. For example, the swing arm or splicer 22, the wire cut off blades 26 and the wire splicing blades 28 may be formed as one element.

The mounting base 16 and bulb lighting assembly 17 are then fitted onto the sealing or mounting grommet 31 and the mounting strap 14 is brought around and passed through the tensioning outer latch or mounting lock lever 20. As shown in FIGS. 5A and 5B, the mounting lock lever 20 is pivotally arranged on the mounting base 16 for receiving the mounting strap 14 after it is wrapped around the tubing 44 or other suitable mounting structure when in an open lever position as shown in FIG. 5A and for frictionally engaging and holding the mounting strap 14 when pivotally rotated into a closed lever position as best shown in FIG. 5B for coupling the floodlight 10 to the tubing 44 or another suitable mounting structure.

FIG. 6 shows various views of the floodlight 10 mounted on the tubing 44. In particular, FIG. 6C shows the floodlight 10 which the bulb enclosure assembly 14 is capable of being swiveled from left to right about 23 degrees on the mounting base 16.

Consistent with that discussed above, the current bracket designs known in the art require the products electrical wiring be connected to the wiring via wire connectors or soldering operations; and once the connections are made, the connections are "stuffed" into the tubing and the access hole sealed using a grommet or sealant. With the new dual latch bracket design according to the present invention, the inner latch 22 acts a wire splicer. The battery wires 40, 42 are drawn through the hole in the tubing, through the wire sealing grommet 31 provided, and are inserted into the splicing latch. The splicing latch is then closed; the electrical connections are made and the wires are spliced. Once the outer tensioning latch is closed, the spliced wire contacts are sealed by the integral gasket.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein without departing from the spirit and scope of the present invention.

The invention claimed is:

1. A dual latch bracket with integral strap tensioning and wire splicing for mounting a light or other suitable bracket mounted product or device on a tubing or other suitable mounting structure, comprising:

a mounting arrangement having a mounting base for supporting the light or other suitable product or device on the tubing or another suitable mounting structure, and having a mounting strap for wrapping around the tubing or other suitable mounting structure; and a splicing latch arrangement having a swing arm or splicer pivotally arranged on the mounting base for receiving the one or more wires when in an open position and for splicing the one or more wires to the internal leads in the mounting base when pivotally rotated to a closed position, and having a mounting lock lever pivotally arranged on the mounting base for receiving the mounting strap when in an open lever position and for frictionally engaging and holding the same when pivotally rotated into a closed lever position for coupling the light to the tubing or another suitable mounting structure.

2. A dual latch bracket according to claim 1, wherein the splicing latch arrangement includes wire splicing blades arranged in the mounting base for slicing the wires in response to the pivotal movement of the swing arm or splicer.

3. A dual latch bracket according to claim 1, wherein the splicing latch arrangement includes wire cut off blades arranged in the mounting base to splice the one or more wires in response to the pivotal movement of the swing arm or splicer.

4. A dual latch bracket according to claim 1, wherein the light is a floodlight.

5. A bracket mounted product or device, such as a light, having a dual latch bracket with integral strap tensioning and wire splicing for mounting the bracket mounted product or device on tubing or another suitable mounting structure, the dual latch bracket comprising:

a mounting arrangement having a mounting base for supporting the light or other suitable product or device on the tubing or another suitable mounting structure, and having a mounting strap for wrapping around the tubing or other suitable mounting structure; and a splicing latch arrangement having a swing arm or splicer pivotally arranged on the mounting base for receiving the one or more wires when in an open position and for splicing the one or more wires to the internal leads in the mounting base when pivotally rotated to a closed position, and having a mounting lock lever pivotally arranged on the mounting base for receiving the mounting strap when in an open lever position and for frictionally engaging and holding the same when pivotally rotated into a closed lever position for coupling the light to the tubing or another suitable mounting structure.

6. A bracket mounted product or device according to claim 5, wherein the splicing latch arrangement includes wire splicing blades arranged in the mounting base for slicing the wires in response to the pivotal movement of the swing arm or splicer.

7. A bracket mounted product or device according to claim 5, wherein the splicing latch arrangement includes wire cut off blades arranged in the mounting base to splice the one or more wires in response to the pivotal movement of the swing arm or splicer.

* * * * *